(12) United States Patent
Yu et al.

(10) Patent No.: US 8,761,474 B2
(45) Date of Patent: Jun. 24, 2014

(54) METHOD FOR VASCULAR FLOW PATTERN ANALYSIS

(75) Inventors: Daphne Yu, Yardley, PA (US); Wei Li, Princeton, NJ (US); Feng Qiu, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 216 days.

(21) Appl. No.: 13/535,607

(22) Filed: Jun. 28, 2012

(65) Prior Publication Data

US 2013/0051640 A1 Feb. 28, 2013

Related U.S. Application Data

(60) Provisional application No. 61/511,249, filed on Jul. 25, 2011.

(51) Int. Cl.
G06K 9/00 (2006.01)
G06K 9/34 (2006.01)
G06K 9/48 (2006.01)

(52) U.S. Cl.
USPC ............ 382/128; 382/131; 382/173; 382/199

(58) Field of Classification Search
USPC .................................. 382/128, 131, 173, 199
See application file for complete search history.

(56) References Cited

U.S. PATENT DOCUMENTS

| | | | |
|---|---|---|---|
| 7,369,691 B2 * | 5/2008 | Kondo et al. | 382/128 |
| 7,953,266 B2 * | 5/2011 | Gulsun et al. | 382/131 |
| 8,285,011 B2 * | 10/2012 | Chen et al. | 382/128 |
| 2006/0280351 A1 * | 12/2006 | Luping et al. | 382/128 |
| 2007/0014452 A1 * | 1/2007 | Suresh et al. | 382/128 |
| 2007/0231393 A1 * | 10/2007 | Ritter et al. | 424/489 |
| 2011/0103665 A1 * | 5/2011 | Gulsun et al. | 382/131 |

OTHER PUBLICATIONS

Stalder AF1, Russe MF, Frydrychowicz A, Bock J, Hennig J, Markl M. "Quantitative 2D and 3D phase contrast MRI: optimized analysis of blood flow and vessel wall parameters," Magn Reson Med. Nov. 2008;60(5):1218-31.*

V. Mihalef, R. I. Ionasec, P. Sharma, B. Georgescu, I. Voigt, M. Suehling, and D. Comaniciu, "Patient-specific modelling of whole heart anatomy, dynamics and haemodynamics from four-dimensional cardiac CT images", Royal Society Interface Focus Journal, 2011 pp. 286-296, vol. 1.

M. A. Gülsün and H. Tek, "Robust Vessel Tree Modeling", MICCAI '08 Proceedings of the 11th International Conference on Medical Image Computing and Computer-Assisted Intervention—Part I, 2008, pp. 602-611, vol. 5241, Springer-Verlag, Berlin, Heidelberg.

* cited by examiner

*Primary Examiner* — Utpal Shah

(57) ABSTRACT

A method (100) of computing and displaying flow information of vascular blood flow patterns, especially in the form of quantitative data plots.

20 Claims, 11 Drawing Sheets

METHOD FOR VASCULAR FLOW PATTERN ANALYSIS

CROSS-REFERENCE TO RELATED APPLICATIONS

This application claims the benefit of Provisional U.S. Patent Application Ser. No. 61/511,249 entitled, "Quantitative Plots for Vascular Flow Pattern Analysis", filed in the name of Daphne Yu, Wei Li, and Feng Qiu on Jul. 25, 2011, the disclosure of which is also hereby incorporated herein by reference.

FIELD OF THE INVENTION

The present invention generally relates to vascular blood flow. More particularly, the present invention relates to the visualization and quantification of vascular blood flow patterns.

BACKGROUND OF THE INVENTION

Vascular blood flow information for a patient can be obtained from computational fluid dynamics simulation based on vascular structure models constructed from 3D medical images such as computed tomography (CT). Flow information can also be directly acquired from actual patients using some medical imaging modality such as magnetic resonance (MR) imaging. In either case, the simulated or acquired data is a 4D vector flow field (3D over time), which is traditionally displayed as animated arrows or other glyph shapes, optionally with color mapping to represent simple derived scalar values such as velocity magnitudes of the flow. Alternatively, the velocity magnitude is visualized as mapped color values on the surface. Examples of such techniques are shown in the blood vessels in FIGS. 1a and 1b.

These techniques are useful for visualization of general impressions of the flow, but are limited in conveying more information, for example, about the amount of the flow and the speed of the flow turbulence, or about occluded flow pattern within sub-regions. It would be advantageous to have a method to compute and display such additional flow information, especially in the form of quantitative data plots. Such generated plots, which may include, for example, a variety of 2D plots, are easy to understand and more importantly, useful to quantify the additional flow information. Also, such generated plots would allow a user to further select a blood vessel sub-region, or a subset of the overall time, based on the plotted information to further explore finer blood flow patterns of interests.

SUMMARY OF THE INVENTION

The aforementioned problems are obviated by an embodiment of the present invention which provides a method of obtaining information of vascular blood flow, comprising: obtaining visualization data of the blood flow in a vascular region of interest; reducing the dimensionality of the visualization data of the blood flow; and decomposing the reduced visualization data to obtain a quantitative representation of the visualization data of the blood flow. The obtaining step may comprise obtaining a series of 3D flow data representing the blood flow as a sequence of time steps. The reducing step may comprise constructing a coordinate frame of reference within the vascular region of interest and displaying data relative to the coordinate frame of reference. The quantitative representation of the visualization data of the blood flow may comprise a quantitative data plot. In such case, the visualization data of the blood flow may comprise 3D visualization data of the blood flow and the quantitative data plot may comprise a quantitative 2D data plot.

Another embodiment of the present invention provides a method for the visualization and quantification of vascular blood flow patterns of a patient vasculature, comprising: defining a region of interest of the patient vasculature from vascular images of the patient vasculature; extracting a centerline of the region of interest; computing simulated parameters of blood flow in the region of interest; extracting intersection planes along the extracted centerline in the region of interest; computing streamlines or pathlines from the computed simulated parameters of the blood flow in the region of interest; and visualizing points of intersection of the streamlines or of the pathlines with the intersection planes. The vascular images may be simulated data or data acquired from an imaging scanner. The defining step may comprise specifying a fluid inlet and a fluid outlet for the region of interest of the patient vasculature. Also, the defining step may comprise defining a region of anomaly within the region of interest of the patient vasculature separately from the remainder of the region of interest. In such case, the extracting a centerline step may comprise excluding the region of anomaly from the extraction of a centerline.

The extracting intersection planes step may comprise sampling the extracted centerline at a specified distance interval for defining the intersection planes. In such case, each intersection plane may be defined to be perpendicular to a respective centerline tangent at the respective sampling location. Also, the extracting intersection planes step may comprise defining a coordinate frame of reference for each intersection plane. The coordinate frame of reference may comprise a polar coordinate frame of reference. The defining a coordinate frame of reference step may comprise minimizing the angle between an axis of a coordinate frame of reference for a respective intersection plane and each of the corresponding axes of the coordinate frames of reference for adjacent intersection planes. Also, the defining a coordinate frame of reference step may comprise normalizing the scale of a coordinate frame of reference to the maximum distance from the extracted centerline to the vascular surface of the region of interest on each intersection plane.

The defining a region of anomaly step may comprise extracting the region of anomaly from the region of interest; constructing a cylindrical or a spherical coordinate frame of reference for the region of anomaly; and constructing intersection planes along a z-axis of the cylindrical coordinate frame of reference or along a selected rotation axis of the spherical coordinate frame of reference. In such case, the constructing intersection planes step may comprise normalizing the scale of a radial distance of a spherical coordinate frame of reference to the maximum spherical center, or of a radial distance of a cylindrical coordinate frame of reference to the maximum cylindrical center, to the surface of the region of the anomaly on each intersection plane.

The computing streamlines or pathlines step may comprise measuring parameters of the points of intersection of the streamlines or of the pathlines with the intersection planes along the extracted centerline in the region of interest. Also, the computing streamlines or pathlines step may comprise measuring parameters of the points of intersection of the streamlines or of the pathlines with the intersection planes along the extracted centerline in the region of interest and with the intersection planes in the region of anomaly. Also, the computing streamlines or pathlines step may comprise selecting a data source for computing the streamlines or pathlines from specific sub-regions in the region of interest. Also, the computing streamlines or pathlines step may comprise selecting a respective spatial region on the fluid inlet for the region of interest as the source for the streamlines or pathlines.

The visualizing step may comprise uniquely mapping the computed streamlines to a curve in a respective 2D plot and uniquely mapping the computed pathlines to a location on the 2D pathline intersection curve. Also, the visualizing step may comprise visualizing points of intersection of the streamlines or of the pathlines with the intersection planes along the extracted centerline in the region of interest and separately visualizing points of intersection of the streamlines or of the pathlines with the intersection planes in the region of anomaly.

Another embodiment of the present invention provides a system for displaying information of vascular blood flow patterns, comprising an imager that acquires image data of a patient's vascular structure and a processor that manipulates the acquired image data to construct sample planes relative to the patient's vascular structure; plotting blood flow patterns of the patient's vascular structure relative to coordinate frames of reference for the sample planes; and correlating the plotted blood flow patterns with respective corresponding blood flow streamlines or pathlines.

BRIEF DESCRIPTION OF THE DRAWINGS

For a better understanding of the present invention, reference is made to the following description of an exemplary embodiment thereof, and to the accompanying drawings, wherein:

FIG. 5a is a schematic representation of sample intersection planes along the centerline of a vascular region;

FIG. 5b is a schematic representation of a polar coordinate grid for a sample intersection plane of FIG. 5a;

DETAILED DESCRIPTION

Figure 1:
FIGS. 1a and 1b are images of vasculature with vascular blood flow indicated.
Figure 2:
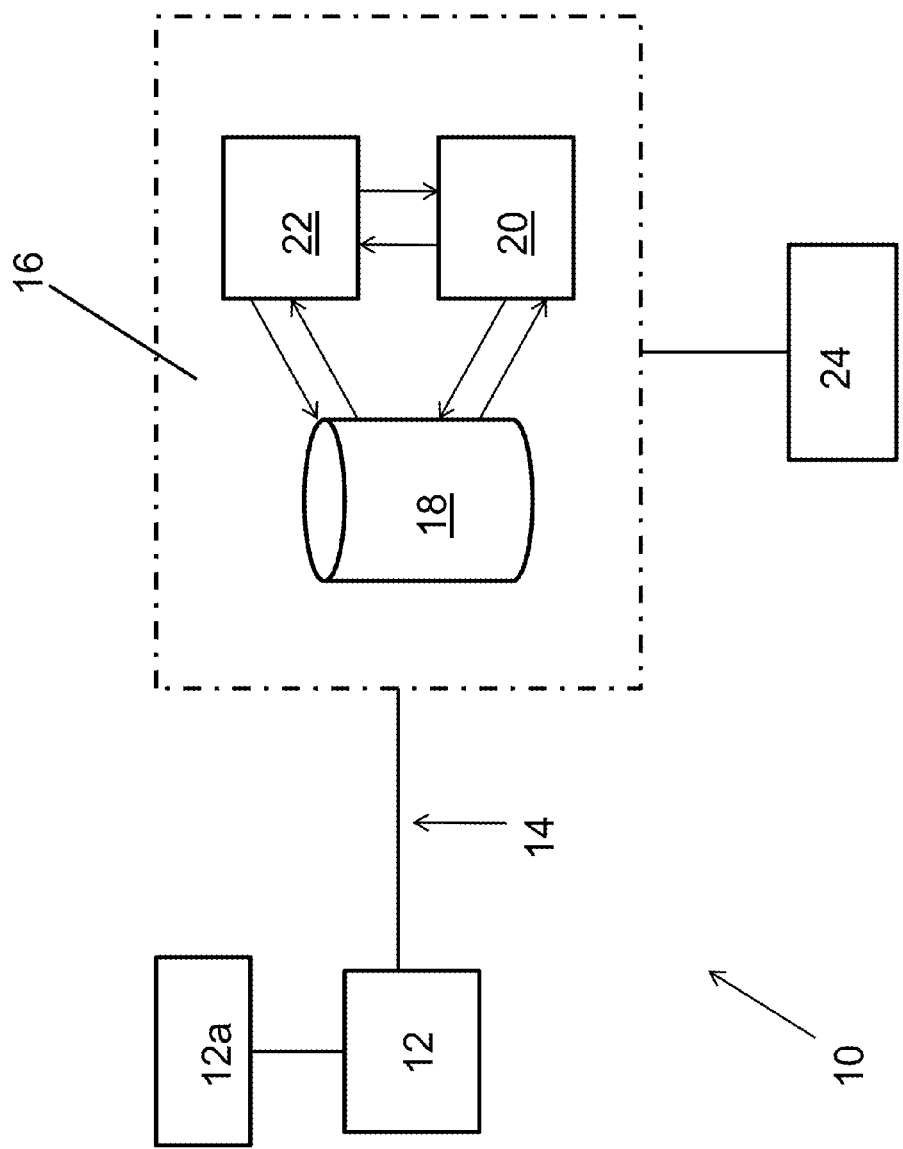
FIG. 2 is a block diagram of a medical imaging system (simplified) that operates in accordance with an embodiment of the present invention.

FIG. 2 is a block diagram of a medical imaging system 10 (simplified) that operates in accordance with an embodiment of the present invention. The system 10 comprises a medical imaging scanner 12 that acquires image data of a patient under examination and, more particularly in this case, vasculature of interest of the patent. The scanner 12 may use any appropriate imaging modality to acquire the image data, for example, magnetic resonance and computed tomography.

The scanner 12 may acquire raw image data from multiple scanned views of the region of interest of the patient, reconstruct the images, and produce image data signals for the multiple views. The image data signals may be in Digital Imaging and Communications in Medicine (DICOM) format. Other formats may also be used.

The imaging scanner 12 is operably connected to a computer system 12a that controls the operation of the scanner 12 and, via a communication channel 14, to an image processing system 16 that processes the image data signals utilizing appropriate image processing software applications. The image processing system 16 has an image data archive or database 18, an application server 20, and a user workstation 22. The components of the image processing system 16 are interconnected via a communications network that may be implemented by physical connections, wireless communications, or a combination. The image data archive or database 18 is adapted to store the image data signals that are produced by the image scanner 12 as well as the results of any additional operations on the image data signals by the other components of the image processing system 16. The image data archive or database 18 may be a Picture Archiving and Communications System (PACS). Other types of image data archives or databases may also be used. The user workstation 22 is adapted to control the operation of the imaging processing system 16 and its various components. The user workstation 22 particularly operates the application server 20c and the various image processing software applications that are stored in, or are accessible by, the server 20. The application server 20 also manages and coordinates the image data sets among the image processing applications. The image processing applications may include, for example, visualization applications, computer-aided diagnosis (CAD) applications, medical image rendering applications, anatomical segmentation applications, or any other type of medical image processing application. The image processing applications may also include the methods of embodiments of the present invention. The image data archive or database 18, applications server 20, and the user workstation may also each be connected to a remote computer network 24 for communication purposes or to access additional data or functionality. The workstation 22 may comprise appropriate user interfaces, like displays, storage media, input/output devices, etc.

The various components of the imaging system 10 are conventional and well known components. They may be configured and interconnected in various ways as necessary or as desired. The imaging system 10 and, in particular, the image processing system 16 is adapted to permit the imaging system 10 to operate and to implement methods in accordance with the embodiments of the present invention, for example, as shown in FIG. 3.

Figure 3A:
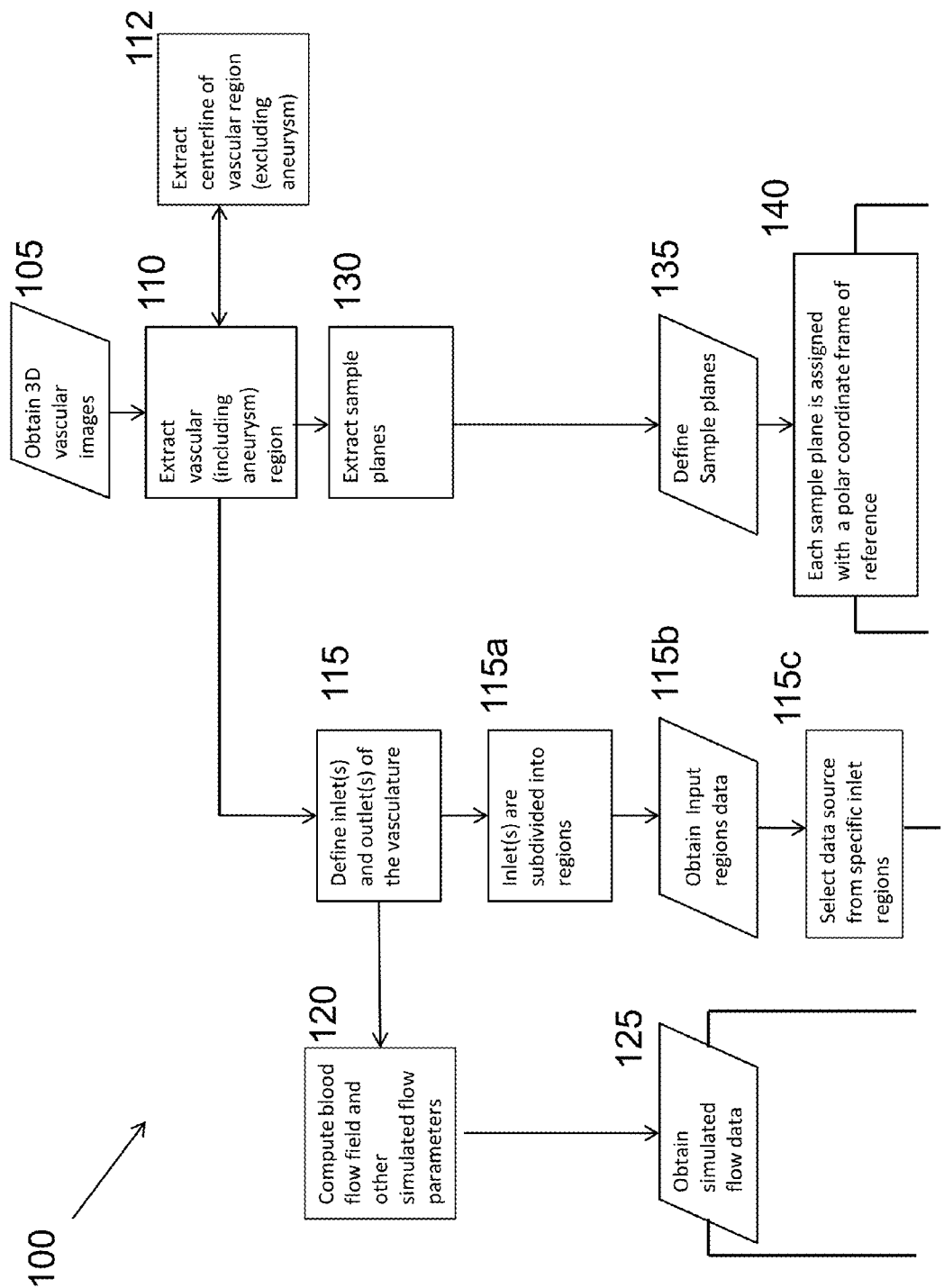
FIGS. 3a-3b is a flow chart of a method implemented in accordance with an embodiment of the present invention.
Figure 3B:
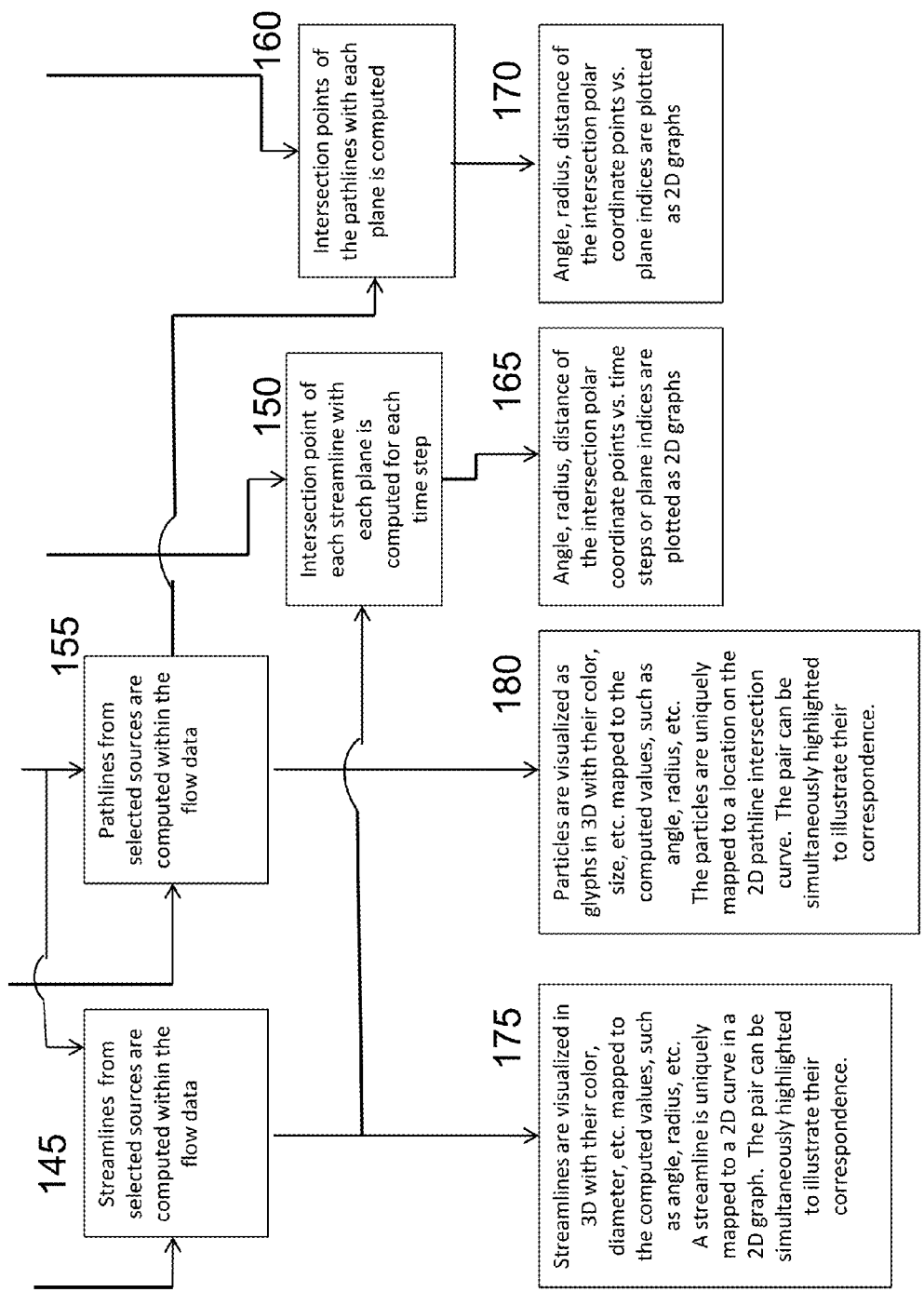

FIGS. 3a-3b show a flow chart of a method 100 carried out in accordance with an embodiment of the present invention. The method 100 generally reduces the dimensionality of visualized vascular blood flow data. Rather than visualizing all of the flow data at once and without the context of the information that is being sought after, the method 100 constructs a frame of reference within the vascular region and displays the data relative to this reference.

Figure 4:
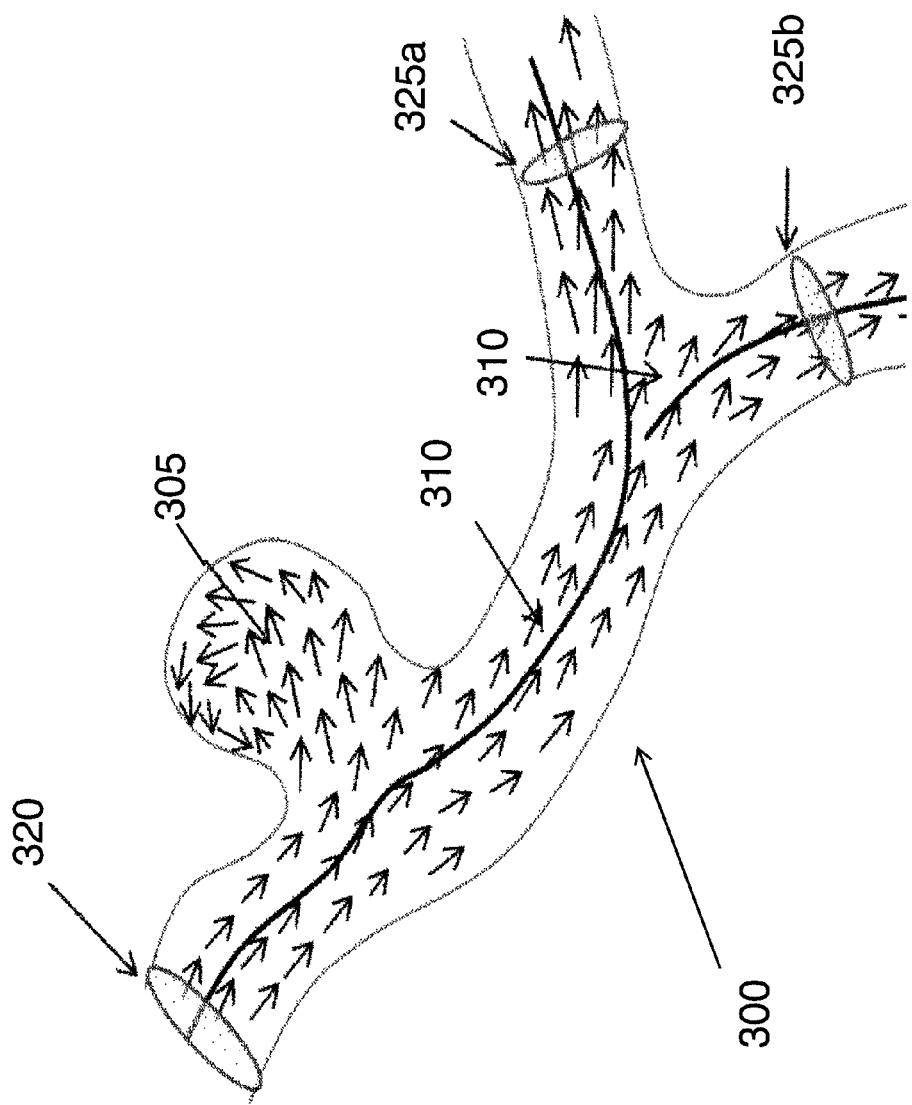
FIG. 4 is a schematic representation of a vascular region with an aneurysm region.

Specifically, the method 100 uses as an input 3D vascular images of a patient vasculature (Step 105). As noted, the images may be simulated or acquired data obtained via an appropriate imaging modality, for example, 3D computer tomography (CT) or magnetic resonance (MR) imaging. The system 10 user defines the vasculature region of interest on a display of a respective vasculature image, such as by means of drawing contours around or painting over the region of interest, or by other region definition algorithms that may be available through the system 10, such as region growing or more advanced segmentation (Step 110). Typically the vascular region of interest includes a region of anomaly such as an aneurysm. If, for example, an aneurysm is present, the user may further define the aneurysm region through similar region of interest definition methods as described above. A centerline of the vascular region of interest is then computed/extracted from the region of interest (Step 112) (this is described further, for example, in an article by V. Mihalef, R. I. Ionasec, P. Sharma, B. Georgescu, I. Voigt, M. Suehling, and D. Comaniciu, entitled "Patient-specific modelling of whole heart anatomy, dynamics and haemodynamics from four-dimensional cardiac CT images", Royal Society Interface Focus Journal, 2011 pp. 286-296, vol. 1). The aneurysm region may be marked to be excluded from the centerline calculation in order to prevent the centerline from going into the aneurysm or creating broken or self intersecting centerlines. The user may also specify planes perpendicular to the centerline intersecting the vasculature as fluid inlet and outlets (Step 115). FIG. 4 illustrates a vascular region of interest 300 as a surface outline, an aneurysm region 305, an extracted centerline 310 of the vascular region of interest 300 and a fluid inlet 320 and two fluid outlets 325*a*, 325*b*. The vascular blood flow is shown as arrows. Note that the vascular region of interest 300 and the extracted centerline 310 are illustrated as bi-furcated elements although they may take on other configurations. Note also that FIG. 4, as well as the other figures described herein, illustrate inlets, outlets and sample planes as elliptical planes just for illustrative simplicity. The actual surface contour intersection with the planes can be arbitrarily shaped. The vascular blood flow field and other simulated flow parameters are computed using the inlet and outlet definitions as well as the vascular surface as input (Step 120). A variety of methods and variants of computational fluid dynamics simulation may be used (this is described further, for example, in a presentation by M. A. Gülsün and H. Tek, entitled "Robust Vessel Tree Modeling", MICCAI 2008 Proceedings of the 11th International Conference on Medical Image Computing and Computer-Assisted Intervention—Part I, 2008, pp. 602-611, vol. 5241, Springer-Verlag, Berlin, Heidelberg).

Figure 5:
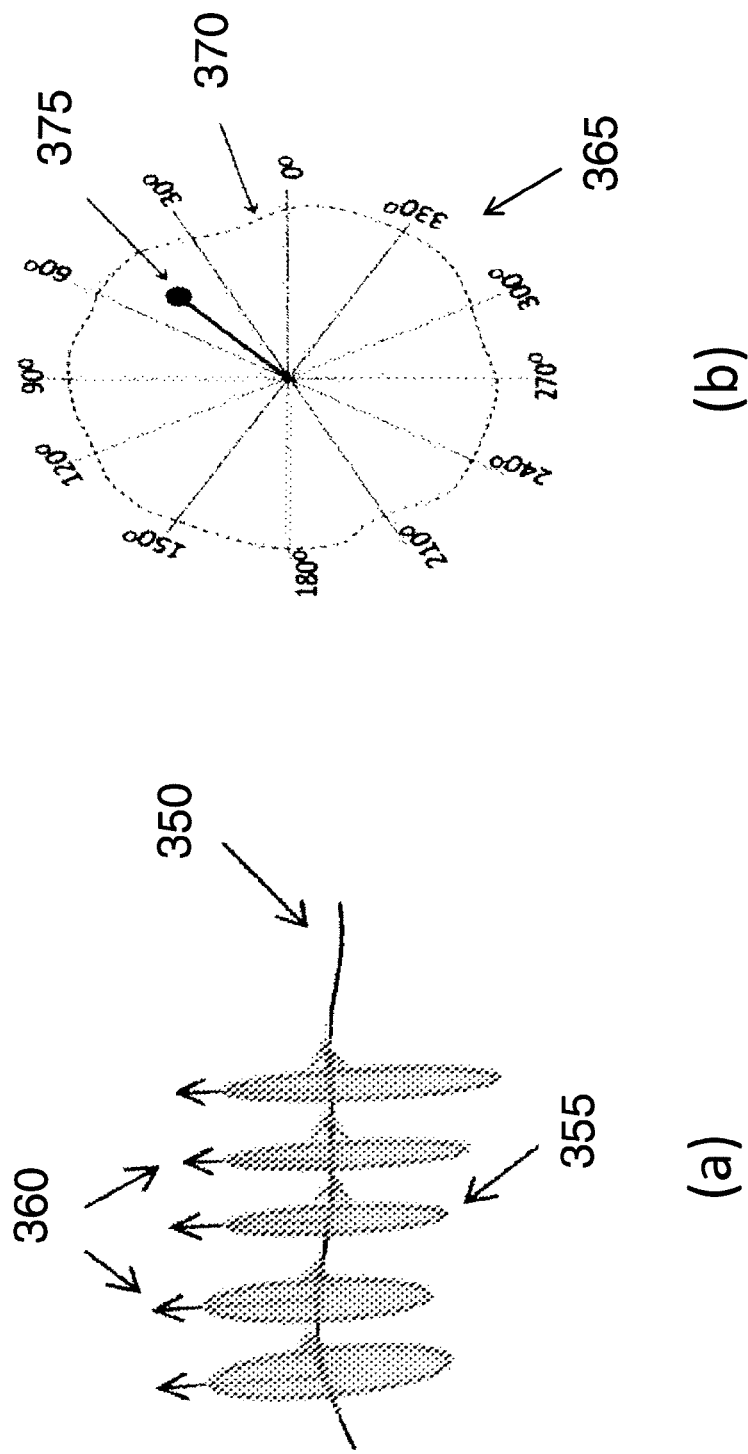

The simulation obtains a series of 3D flow data representing the vascular blood flow as a sequence of time steps (Step 125). To reduce the dimensionality of the simulated output flow data, points are sampled and sample planes are computed along the centerline of the vascular region of interest (Step 130). This is illustrated in FIGS. 5*a* and 5*b*. Each vasculature centerline segment is labeled and sampled at a specified distance interval. At each sample point location of the centerline 350, an intersection plane 355 perpendicular to the respective centerline tangent is defined (Step 135). A polar coordinate frame of reference for each intersection plane 355 is defined with its center reference at the centerline location (Step 140). FIG. 5*b* shows a sample polar grid 365 for an intersection plane 355 with the contour 370 of the intersection between the sample plane 355 and the specific vasculature, and the intersection point 375 of each streamline or pathline with each sample intersection plane 355. To keep the coordinate frames 360 as consistent as possible between sample planes 355, particularly in rotation, the angle between the axis of the coordinate frame within a local neighborhood and each of the axes of the adjacent frames is minimized. The scale of the coordinate frame can be kept consistent across the sample planes 355 in an arbitrary scale. The specific rotation of the coordinate frame axis and the scale is not important as long as it is consistent as much as possible to the anatomy of the vascular structure. Optionally, it may also be desirable to normalize the scale of the coordinate frame to the maximum distance from the centerline 350 to the vascular surface on each sample plane 355, as that may give the user a reference to the vascular wall as an indication of wall shear.

Note that if an aneurysm region is present in the vascular region of interest, it is common that a centerline extraction method may create a singularity at the aneurysm location. The method 100 handles the aneurysm region differently from the rest of the vascular region that is tubular shaped. The method 100 may achieve this by using a manual or semi-automatic segmentation of the aneurysm region, e.g. by using similar methods as the vascular region extraction methods described above. Generally, once the aneurysm region has been identified, the region can be masked out from the centerline extraction to produce a centerline without the singularity. Furthermore, the method 100 applies a separate set of coordinate frames to the aneurysm region.

Figure 6:
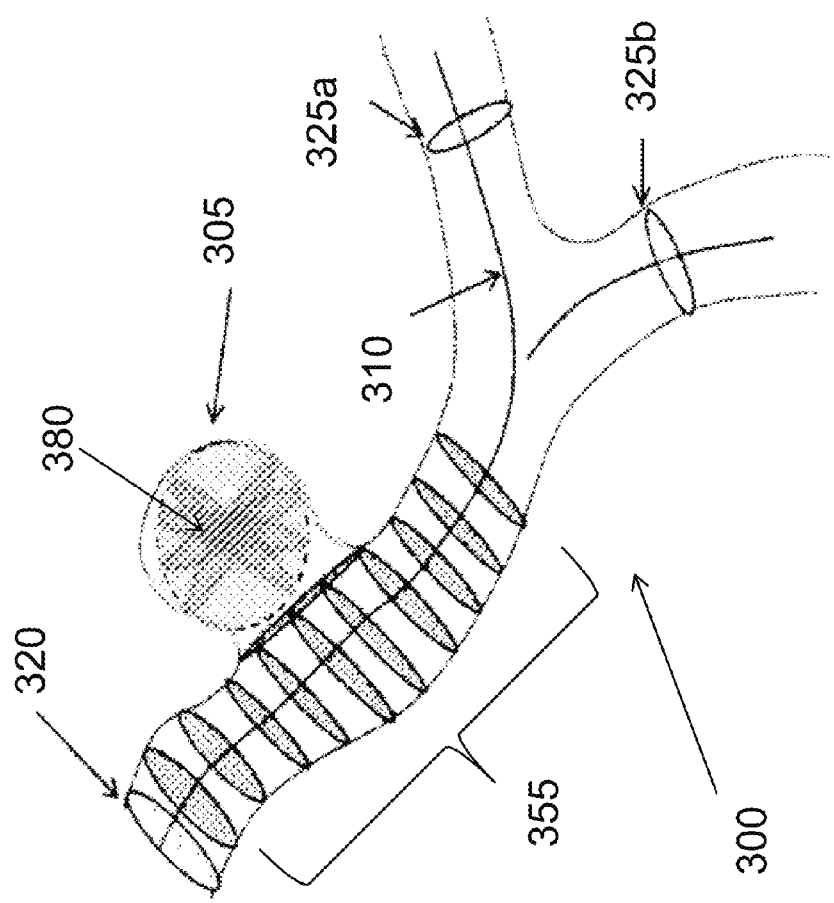
FIG. 6 is a second schematic representation of a vascular region with an aneurysm region.

FIG. 6 illustrates a process that may be used by the method 100 to handle the aneurysm region differently from the rest of the vascular region. As described above, sample intersection planes 355 are computed along the centerline 310 of the vascular region of interest 300. The centerline segment is labeled and sampled at a specified distance interval and, at each sample point location of the centerline 350, an intersection plane 355 perpendicular to the respective centerline tangent is defined. A polar coordinate frame of reference for each intersection plane 355 may be defined with its center reference at the centerline location. Similarly, spherical coordinate frames of reference may be fitted within a respective aneurysm region 305. A spherical coordinate frame location can be defined by finding a best fit of a spherical surface within the aneurysm region 305, e.g. by minimizing surface distances or volume. A respective location can also be defined by a user through a graphical user interface. Sample intersection planes 380 can be then be created by sampling within the spherical coordinate by varying the inclination angle $\theta$ or the azimuth angle $\phi$ (along the rotation axis). The scale of the radial distance can be normalized to the maximum spherical center to the aneurysm 305 surface.

Figure 7:
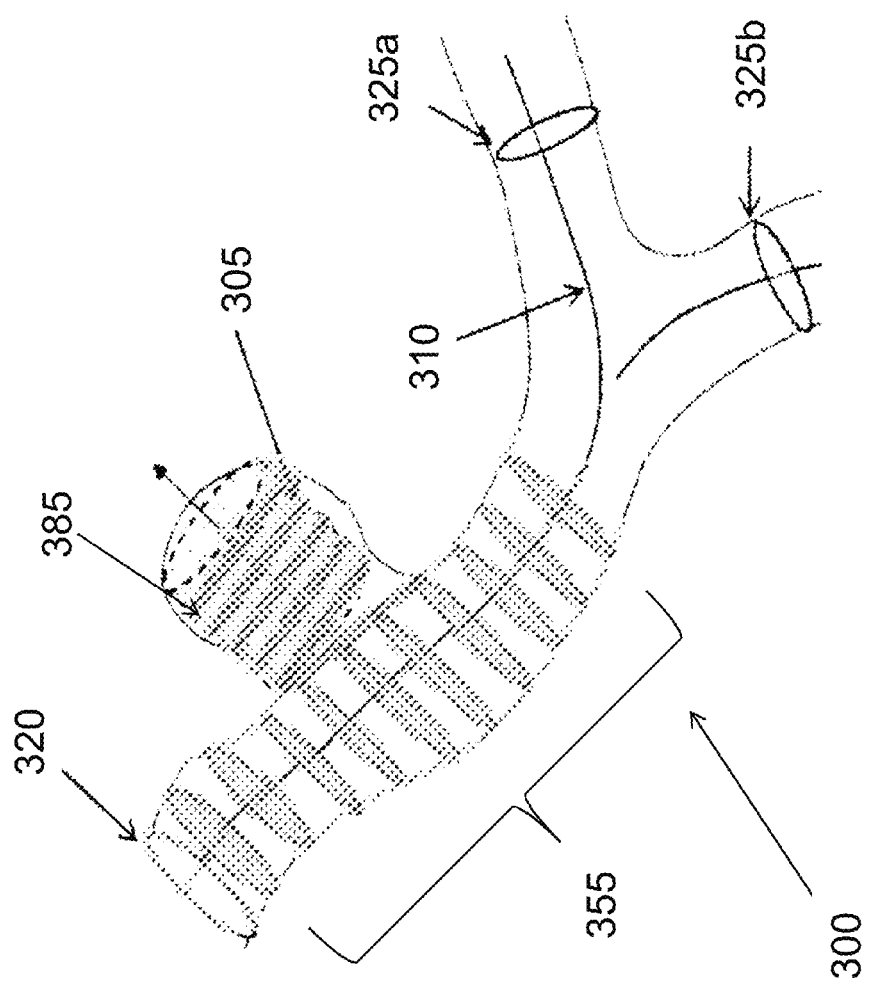
FIG. 7 is a third schematic representation of a vascular region with an aneurysm region.

Alternatively, the aneurysm region 305 can be fitted or manually defined with cylindrical coordinate frames of reference. This is process is illustrated in FIG. 7. Sample intersection planes 385, in this case, can be created by sampling along the z-axis of the coordinate system. The scale of the radial distance p can be normalized to the maximum cylinder center to the aneurysm 305 surface.

Figure 8:
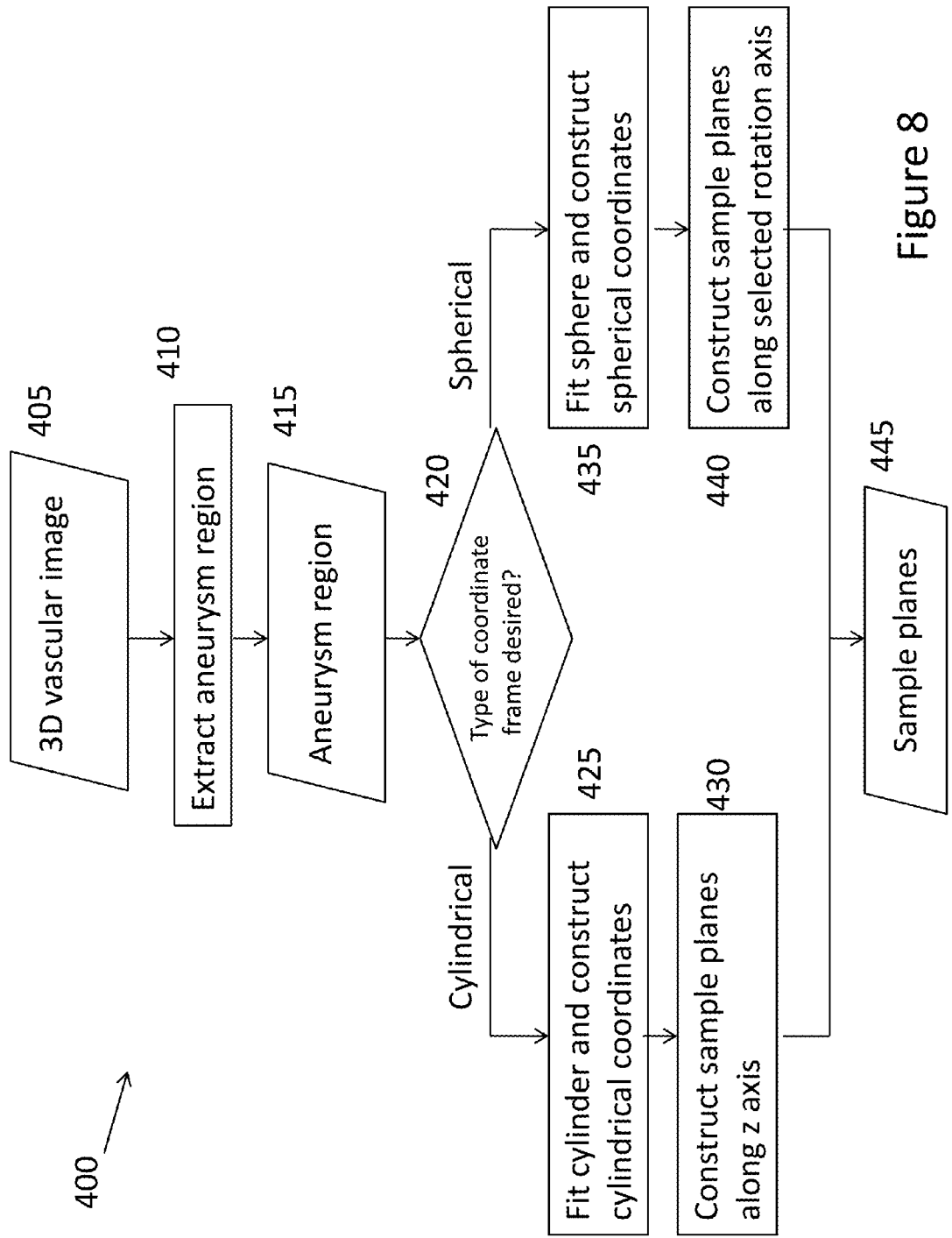
FIG. 8 is a flow chart for a process of an embodiment of the present invention for sample intersection plane definitions for an aneurysm.

FIG. 8 is a flow chart that summarizes the overall process 400 that may be used by the method 100 for sample plane definitions in an aneurysm region 305 illustrated in FIGS. 6 and 7. As noted above, the method 100 uses as an input 3D vascular images of a patient vasculature (Step 405). Also, the user defines the vasculature region of interest of a respective vasculature image, which may include a region of anomaly such as an aneurysm. The user may further define the aneurysm region, if present, through an appropriate region of interest definition method and extract the aneurysm region (Step 410). The process uses the extracted aneurysm region as an input (Step 415) for the user's decision point on which type of coordinate frame to utilize (Step 420). If the user selects a cylindrical coordinate frame, the aneurysm region can then be automatically fitted or manually defined with cylindrical coordinate frames of reference and a cylindrical coordinate can be constructed (Step 425). Sample intersection planes may be created by sampling along the z-axis of the coordinate system (Step 430). If the user selects a spherical coordinate frame, the aneurysm region can then be automatically fitted or manually defined with spherical coordinate frames of reference and a spherical coordinate can be constructed (Step 435). Sample intersection planes may be created by sampling along the selected rotation axis (Step 440). The process 400 result is sample intersection planes are defined and obtained (Step 445).

Referring back to FIG. 3, once the intersection sample planes are defined (this includes the anomaly or aneurysm sample planes), then the streamlines representing the curves going through the tangent to the velocity flow vector data can be computed from the flow vector data (Step 145). The intersection point 375 of each streamline with each sample intersection plane along the centerline for each time step is computed and represents a point relative to the polar coordinate space (shown in FIG. 5). This is recorded and plotted (Step 150). Alternatively, the pathlines representing the particles traverses over time can be computed by avecting (i.e. the transporting of) the particle fluid object within the flow vector data (Step 155). The intersection point 375 of each pathline and each sample intersection plane in the polar coordinate is recorded and plotted (Step 160). The following parameters about the intersection point 375 are also collected and plotted: angle, radius, phase, time step, and intersection point-centerline distance along the centerline (or sample intersection plane index) (Steps 165, 170).

Similarly within an aneurysm region 305, the cylindrical or spherical coordinate values of the respective intersection points can be collected and plotted. Any combination of two of the parameters/variables can be plotted against each other to review their relational pattern.

Figure 9:
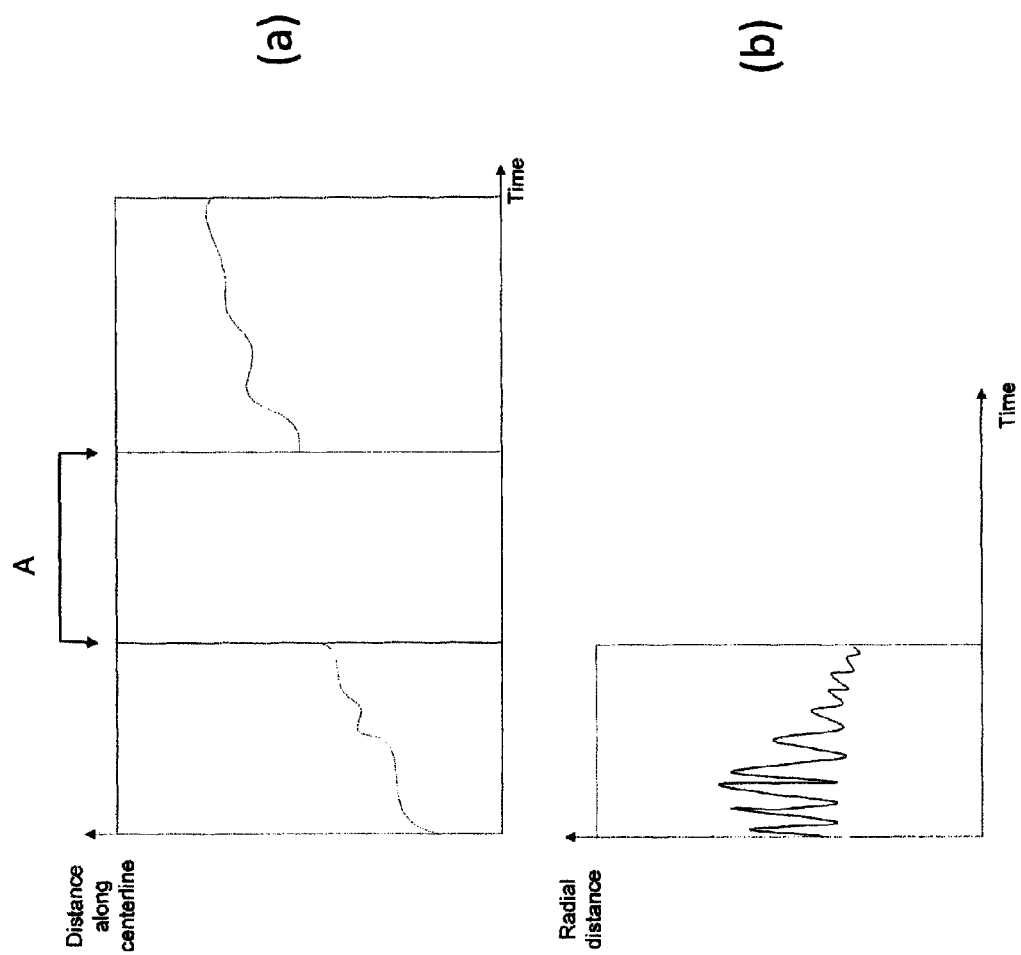
FIGS. 9a and 9b are two quantitative plots that may be generated using pathline intersections.
Figure 10:
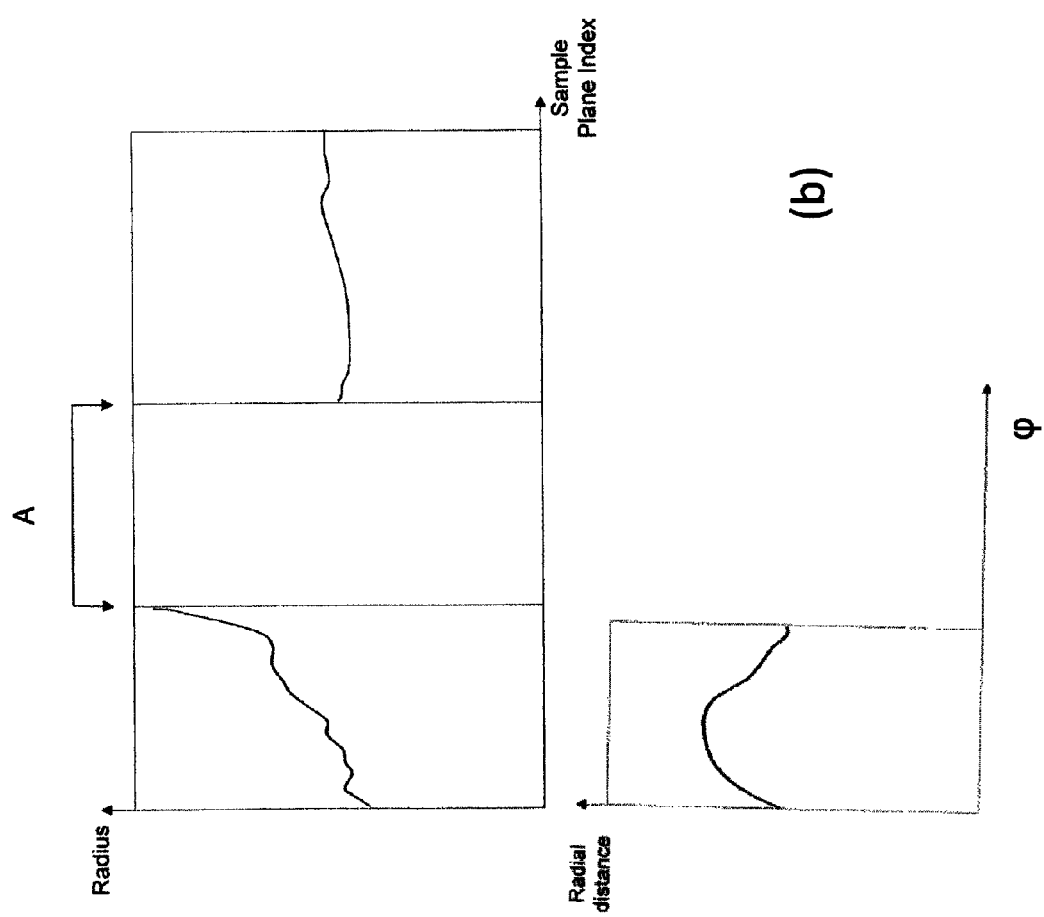
FIGS. 10a and 10b are two quantitative plots that may be generated using streamline intersections.

FIGS. 9a-9b show examples of the types of plots that may be generated by the method 100 using pathline intersections. FIG. 9a is a plot of centerline distance versus time step within the centerline regions. The middle portion A represents the pathline time spent within the aneurysm region 305. The aneurysm data/plot (for example, the plot of FIG. 9b) is entered separately or displayed separately, as desired. FIG. 9b is a plot of the intersection point-radial distance versus the time step within the cylindrical coordinate of the aneurysm region 305. FIGS. 10a-10b show examples of the types of plots that may be generated by the method 100 using streamline intersections. FIG. 10a is a plot of the intersection point radius versus the sample intersection plane index along the centerline. The middle portion A represents the streamline time spent within the aneurysm region 305. The aneurysm data/plot (for example, the plot of FIG. 10b) is entered separately or displayed separately, as desired. FIG. 10b is a plot of the intersection point-radial distance versus the azimuth angle within the spherical coordinate of the aneurysm region 305 at a specific inclination and time step.

The streamlines are uniquely mapped to a 2D curve in a respective 2D graph/plot and the pathlines are uniquely mapped to a location on the 2D pathline intersection curve. Each of the streamlines and the pathlines/particles may also be visualized in 3D on an appropriate display with their physical characteristics (for example, color, diameter, etc.) mapped to the computed values (for example, angle, radius, etc.) (Steps 175, 180). For either case, the system 10 may permit the 2D and 3D representations to be simultaneously highlighted to illustrate their correspondences.

Under the method 100, a user also may choose to intersect not all possible pathlines or streamlines within the flow field. Instead, the user may choose only a streamlines or pathlines source from a specific spatial region on the inlet(s) 320 to be tracked and plotted. To implement this, the inlet region 320 may be divided into sub-regions, each sub-region identified with an identification code, ID (Step 115a), and inlet sub-region data is then obtained (Step 115b). Each streamline or pathline may also be assigned with the inlet sub-region ID from which it is sourced (Step 115c). Each intersection point of the streamlines and pathlines can then be associated with the inlet sub-region from which it is sourced. The user then can select the data source for the streamline or pathlines from specific inlet sub-regions (Step 115c). This method 100 option can be further used to filter the 3D visualization of the streamlines and pathlines by the inlet sub-regions. Since each 2D curve of the plots can be uniquely identified with its corresponding streamline or pathline, the streamline or pathline 3D visualization can also utilize surface color mapping techniques to map colors or opacities of the streamline and pathline with the intersection coordinate or inlet sub-region ID values for visual correspondence.

Advantageously, the method 100 decomposes vascular blood flow patterns that are normally difficult to visualize and quantify to a processing framework that allows for a wide number of quantitative plots to be further analyzed for their clinical values. The 2D plot data and the 3D flow field data correspondence is preserved and can be highlighted together for better visual understanding.

Other modifications are possible within the scope of the invention. For example, the subject patient to be scanned may be a human subject, animal subject or any other suitable object. Also, although the steps of the method 100 or other methods have been described in a specific sequence, the order of the steps may be re-ordered in part or in whole and the steps may be modified, supplemented, or omitted as appropriate. Also, the method 100 or other methods may use various well known algorithms and software applications to implement the steps and substeps. Further, the method 100 or other methods may be implemented in a variety of algorithms and software applications. Further, the method 100 or other methods may be supplemented by additional steps or techniques. It is also understood that the method 100 or other methods may carry out all or any of the steps using real-time data, stored data from a data archive or database, data from a remote computer network, or a mix of data sources.

Also, the various described instrumentation and tools are conventional and well known. They may be configured and interconnected in various ways as necessary or as desired. Further, although in the described method 100 or other methods the user may use self-contained instrumentation and tools, the user may use other instrumentation or tools in combination with or in place of the instrumentation and tools described for any step or all the steps of the respective method, including those that may be made available via telecommunication means. Further, the described method 100 or other methods, or any respective steps, may be carried out automatically by appropriate instrumentation and tools or with some manual intervention.

What is claimed is:
1. A method for the visualization and quantification of vascular blood flow patterns of a patient vasculature, comprising:
   a. defining a region of interest of the patient vasculature from vascular images of the patient vasculature;
   b. extracting a centerline of the region of interest;
   c. computing simulated parameters of blood flow in the region of interest;
   d. extracting intersection planes along the extracted centerline in the region of interest;
   e. computing streamlines or pathlines from the computed simulated parameters of the blood flow in the region of interest; and f. visualizing points of intersection of the streamlines or of the pathlines with the intersection planes.

2. The method of claim 1, wherein the vascular images may be simulated data or data acquired from an imaging scanner.

3. The method of claim 1, wherein the defining step comprises specifying a fluid inlet and a fluid outlet for the region of interest of the patient vasculature.

4. The method of claim 1, wherein the defining step comprises defining a region of anomaly within the region of interest of the patient vasculature separately from the remainder of the region of interest.

5. The method of claim 4, wherein the extracting a centerline step comprises excluding the region of anomaly from the extraction of a centerline.

6. The method of claim 1, wherein the extracting intersection planes step comprises sampling the extracted centerline at a specified distance interval for defining the intersection planes.

7. The method of claim 6, wherein each intersection plane is defined to be perpendicular to a respective centerline tangent at the respective sampling location.

8. The method of claim 1, wherein the extracting intersection planes step comprises defining a coordinate frame of reference for each intersection plane.

9. The method of claim 8, wherein the coordinate frame of reference comprises a polar coordinate frame of reference.

10. The method of claim 8, wherein the defining a coordinate frame of reference step comprises minimizing the angle between an axis of a coordinate frame of reference for a respective intersection plane and each of the corresponding axes of the coordinate frames of reference for adjacent intersection planes.

11. The method of claim 8, wherein the defining a coordinate frame of reference step comprises normalizing the scale of a coordinate frame of reference to the maximum distance from the extracted centerline to the vascular surface of the region of interest on each intersection plane.

12. The method of claim 4, wherein the defining a region of anomaly step comprises extracting the region of anomaly from the region of interest; constructing a cylindrical or a spherical coordinate frame of reference for the region of anomaly; and constructing intersection planes along a z-axis of the cylindrical coordinate frame of reference or along a selected rotation axis of the spherical coordinate frame of reference.

13. The method of claim 12, wherein the constructing intersection planes step comprises normalizing the scale of a radial distance of a spherical coordinate frame of reference to the maximum spherical center, or of a radial distance of a cylindrical coordinate frame of reference to the maximum cylindrical center, to the surface of the region of the anomaly on each intersection plane.

14. The method of claim 1, wherein the computing streamlines or pathlines step comprises measuring parameters of the points of intersection of the streamlines or of the pathlines with the intersection planes along the extracted centerline in the region of interest.

15. The method of claim 12, wherein the computing streamlines or pathlines step comprises measuring parameters of the points of intersection of the streamlines or of the pathlines with the intersection planes along the extracted centerline in the region of interest and with the intersection planes in the region of anomaly.

16. The method of claim 1, wherein the computing streamlines or pathlines step comprises selecting a data source for computing the streamlines or pathlines from specific sub-regions in the region of interest.

17. The method of claim 3, wherein the computing streamlines or pathlines step comprises selecting a respective spatial region on the fluid inlet for the region of interest as the source for the streamlines or pathlines.

18. The method of claim 1, wherein the visualizing step comprises uniquely mapping the computed streamlines to a curve in a respective 2D plot and uniquely mapping the computed pathlines to a location on the 2D pathline intersection curve.

19. The method of claim 12, wherein the visualizing step comprises visualizing points of intersection of the streamlines or of the pathlines with the intersection planes along the extracted centerline in the region of interest and separately visualizing points of intersection of the streamlines or of the pathlines with the intersection planes in the region of anomaly.

20. A system for displaying information of vascular blood flow patterns, comprising an imager that acquires image data of a patient's vascular structure and a processor that manipulates the acquired image data to construct sample planes relative to the patient's vascular structure; plotting blood flow patterns of the patient's vascular structure relative to coordinate frames of reference for the sample planes; and correlating the plotted blood flow patterns with respective corresponding blood flow streamlines or pathlines.

* * * * *